United States Patent [19]

Okuda et al.

[11] 4,338,142

[45] Jul. 6, 1982

[54] MELTING FLUX COMPOSITION FOR SUBMERGED ARC WELDING

[75] Inventors: Naoki Okuda, Kamakura; Kazuo Tanaka, Yokosuka, both of Japan

[73] Assignee: Kobe Steel, Limited, Kobe, Japan

[21] Appl. No.: 226,090

[22] Filed: Jan. 19, 1981

[51] Int. Cl.³ .............................................. B23K 35/34
[52] U.S. Cl. ........................................... 148/26; 75/53
[58] Field of Search ....................... 148/26; 75/53, 257

[56] References Cited

U.S. PATENT DOCUMENTS

| | | | |
|---|---|---|---|
| 2,719,801 | 10/1955 | Stringham | 148/26 |
| 2,751,478 | 6/1956 | Jackson | 148/26 |
| 2,755,211 | 7/1956 | Jackson | 148/26 |
| 3,023,133 | 2/1962 | Lewis | 148/26 |
| 4,248,631 | 2/1981 | More | 75/53 |

*Primary Examiner*—P. D. Rosenberg
*Attorney, Agent, or Firm*—Oblon, Fisher, Spivak, McClelland & Maier

[57] ABSTRACT

A melting flux composition for submerged arc welding which comprises 6–15% by weight of MgO, 5–10% by weight of CaO, 10–20% by weight of $CaF_2$, 14–19% by weight of $Al_2O_3$, 20–25% by weight of $TiO_2$, 15–20% by weight of $SiO_2$, and 5–10% by weight of MnO. Optionally, the composition further comprises $B_2O_3$ or other oxide components, such as iron oxide and alkali metal oxides.

5 Claims, No Drawings

MELTING FLUX COMPOSITION FOR SUBMERGED ARC WELDING

BACKGROUND OF THE INVENTION

1. Field of the Invention

This invention relates to the welding art and more particularly to melting fluxes for submerged arc welding which have improved detachability of slag and are free of slag inclusion when applied to high speed welding.

2. Description of the Prior Art

In the manufacture of various types of equipment and tanks for chemical industries using thick steels, it is the general practice that a large proportion of time in the manufacturing process is occupied by welding time. Accordingly, welding materials used for such purposes should ensure good welding workability and should not produce welding defects which require later correction. One of the factors which influences welding workability is the above-mentioned detachability of slag from the weld metal. When submerged arc welding is conducted using a flux which is poor in slag detachability, much labor and time is required to remove once-formed slag. If the slag is insufficiently removed, welding defects such as failure in welding penetration, slag inclusion, and the like take place when a subsequent layer is welded. To avoid this, many studies have been made to improve slag detachability, the present invention being such an improvement.

In order to improve slag detachability, there have been heretofore proposed fluxes which incorporate $Al_2O_3$, $TiO_2$, $SiO_2$, and the like in suitable amounts, such as are disclosed in Japanese laid-open Patent Publication Nos. 55-10356, 55-10357, and 55-10358.

However, when low heat input and high velocity welding is conducted using fluxes which contain more than 20% $Al_2O_3$, there may occur a slag inclusion phenomenon in which slag is included in the molten metal where it solidifies in the weld.

In order to reduce the amount of $Al_2O_3$ in fluxes and to improve the detachability of slag, we have made an investigation of factors which influence detachability. Though a number of the factors that influence detachability have been known, including solidifying temperature, viscosity, wettability, thermal expansion coefficient, and the like, it has been found most important that slag should not spread out in the root gap, especially in the case of narrow grooves. To achieve this favorable end, it has been found that a flux should have a relatively high solidifying temperature and a high viscosity at high temperatures. Thus, we have made extensive studies of fluxes which satisfy the above requirement, in which various kinds and proportions of flux constituents are compared.

SUMMARY OF THE INVENTION

It is an object of the present invention to provide melting fluxes which show good or remarkably improved detachability of slag without causing any slag inclusion, especially when applied to a low heat input and high velocity welding procedure.

It is another object of the present invention to provide melting fluxes for submerged arc welding of steel which have a reduced amount of $Al_2O_3$ compared with prior art counterparts.

It is a further object of the present invention to provide melting fluxes for submerged arc welding of steel which ensure excellent shape or appearance of beads and excellent toughness and resistance to cracking of weld metal.

It is a still further object of the present invention to provide fluxes for submerged arc welding of steel which enable various welding operations, including multioverlay welding using thick steel materials, to be carried out simply and rapidly.

The above objects are achieved by a melting flux composition for submerged arc welding which comprises 6–15% by weight of MgO, 5–10% by weight of CaO, 10–20% by weight of $CaF_2$, 14–19% by weight of $Al_2O_3$, 20–25% by weight of $TiO_2$, 15–20% by weight of $SiO_2$, and 5–10% by weight of MnO.

In order to further improve the low temperature toughness of weld metal, the flux composition may further incorporate about 0.1–1.5% by weight of $B_2O_3$.

DESCRIPTION OF THE PREFERRED EMBODIMENTS

According to our experiments, it has been confirmed that fluxes using MgO, $Al_2O_3$, and $TiO_2$ exhibit excellent slag detachability, and that when $Al_2O_3$ is reduced in amount MgO serves to compensate for the reduced effect of $Al_2O_3$. In this connection, however, the MgO component has a high melting point, so that the solidifying temperature of slag becomes very high, thus causing deterioration in the shape or appearance of the bead in the case of low heat input welding. To avoid this, it is necessary to use CaO, $CaF_2$, MnO, $SiO_2$ and the like in combination with the above-mentioned components so as to lower the solidifying temperature of the slag. However, when the amount of acidic components such as $SiO_2$ is increased, there is a tendency toward lower toughness of weld metal because of an increase of oxygen content. On the other hand, basic components such as CaO serve to increase the basicity of fluxes and reduce the oxygen content of weld metal with the toughness of weld metal being increased. However, excessive amounts of the basic components are disadvantageous since the quantity of hydrogen increases, resulting in lowering of the resistance to cracking of the weld metal. Further, $CaF_2$ and MnO act to improve the wettability of slag, but excessive amounts thereof lower slag detachability.

As will be appreciated from the above, the individual flux constituents have been found to show their inherent characteristics when they are used to prepare a flux.

The flux composition for submerged arc welding in accordance with the present invention, which comprises the ingredients in such specific proportions as defined herein, is especially effective when applied to the low heat input and high velocity welding method and ensures easy detachment of slag in such a welding while suppressing slag inclusion. In addition, the flux composition can satisfy such requirements as good shape or appearance of bead, toughness, and resistance to cracking of the weld metal.

The reasons for the contents of the individual constituents or ingredients being determined as defined herein will be described.

MgO is a component which is essentially required to improve the detachability of slag and which should be present in an amount of 6–15% (percent by weight on the basis of total flux in this and other occurrences). Lesser amounts than 6% are disadvantageous in that the slag tends to be deposited on the surface of the bead, and its detachability becomes extremely poor. On the other hand, if the amount of MgO is greater than 15%, the solidifying temperature of the slag becomes too high, particularly in the case of relatively low heat input welding, such as narrow gap welding, one-pass both-side welding of thin plates (sheets), etc., thereby causing deterioration of bead appearance and enhancement of slag inclusion in the weld metal. Thus the MgO content should preferably be kept below 15%.

CaO is essential for imparting a certain degree of toughness to weld metal by increasing the basicity of the flux as described hereinbefore and should be present in the range of 5–10%. Lesser amounts than 5% are not advantageous since the effect of the component becomes unsatisfactory with a sacrifice of the toughness of the weld metal. On the other hand, larger amounts than 10% result in an increase in the content of hydrogen in the weld metal, leading to a poor resistance to cracking.

$CaF_2$ is an essential component for controlling the solidifying temperature and viscosity of slag and should be present in the range of 10–20%. Lesser amounts than 10% result in too high a solidifying temperature and viscosity of the slag with the bead badly shaped. Larger amounts than 20% are unfavorable since pockmarks tend to be produced on the bead surface.

$TiO_2$ is an essential component for improving the detachability of the slag and should be present in the range of 20–25%. Lesser amounts than 20% are disadvantageous because of a tendency to produce pockmarks. Larger amounts than 25% are rather favorable from the viewpoint that detachability of the slag is improved but have to be avoided since the viscosity of the flux becomes too high; additionally, the bead appearance is worsened especially when the flux is applied by low heat input welding. It will be noted here that when $TiO_2$ is incorporated in the aforementioned range, Ti is allowed to be present in an amount of 0.010–0.025% by weight of the weld metal, thereby imparting an excellent low temperature toughness to the weld metal.

$Al_2O_3$ serves to enhance the slag detachability when coexistent with $TiO_2$ and MgO and is a stable neutral component. Its content can thereby be arbitrarily varied without influencing the basicity of the flux. In this sense, $Al_2O_3$ is one of the valuable constituents according to the present invention. Alumina should be present in the range of 14–19%. Lesser amounts than 14% are not favorable since the above effect cannot be significantly produced. Larger amounts than 19% result in too high a solidifying temperature and viscosity of the slag, thereby causing the bead shape to worsen. In addition, when low heat input and high velocity welding is conducted, there is a tendency for slag inclusion to take place in the weld metal.

$SiO_2$ is an acidic component essential for controlling the basicity and solidifying temperature of the slag and should be present in the range of 15–20%. Lesser amounts than 15% are not advantageous since the above-mentioned effects are then not significant, whereas larger amounts than 20% are not favorable since the quantity of oxygen in the weld metal increases, and thus the toughness of the weld metal is lowered.

MnO is effective as a component which serves to lower the solidifying temperature and viscosity of the slag, and should be present in the range of 5–10%. Lesser amounts than 5%, are not favorable since the above effect cannot be attained, whereas larger amounts than 10% show disadvantageous in that pockmarks tend to be produced in the bead, and the detachability of the slag becomes poor.

In order to further enhance the low temperature toughness of the weld metal, the flux composition according to the present invention may further comprise about 0.1–1.5% of $B_2O_3$. During the course of welding, $B_2O_3$ is reduced to boron which is incorporated in the weld metal (i.e. B is incorporated in the weld metal in an amount of about 0.001–0.001 wt% when $B_2O_3$ is admixed in such an amount of defined above). Boron, in coexistence with Ti, serves to give a fine structure to the weld metal and to further enhance the low temperature toughness of the weld metal. In this connection, however, when $B_2O_3$ is present in large amounts in the flux composition, the amount of boron in the weld metal becomes too great, increasing the sensitivity of the weld metal to cracking. Accordingly, the upper limit of $B_2O_3$ should be about 1.5% if it is added.

In addition to $B_2O_3$ and the essential components, the flux composition according to the invention may further comprise, for example, iron oxide and alkali metal oxides such as $Na_2O$, $K_2O$ and the like. In order to ensure the effectiveness of the flux composition of the present invention and particularly to ensure good slag detachability, it is necessary that the total of the essential components defined herein should be in the range of above 85%. Lesser amounts are not favorable since their effects on the flux of the present invention would not be significant. That is, iron oxide and the alkali metal oxides should be present in amounts of up to 15 wt% as a total.

The melting flux which satisfies the requirements discussed above shows an excellent slag detachability with little or no slag inclusion when applied by the low heat input and high velocity welding technique and can yield a weld metal of excellent physical properties. These effects are attained irrespective of welding conditions and the size distribution of granules of the flux.

However, in order to further enhance the welding workability or usability tend to improve the shape and appearance of the bead, the optimum size distribution of granules of the flux has been investigated, and as a result, it has been found most suitable that the granules of the flux have such a size distribution that granules having sizes greater than 840 microns are present in an amount of below 5%, and those having sizes smaller than 420 microns are present in amounts above 50%, both based on the total composition. When the amount of granules of sizes greater than 840 microns exceeds 5%, voltage becomes slightly unstable during application of low current welding, showing a tendency toward disturbing the waveform of the bead. Additionally, when granules of sizes smaller than 420 microns are present in amounts less than 50%, the bead width becomes so narrow that it shows a tendency to have a poor affinity for a matrix. However, substantially no influence of the distribution in size of granules of the flux on slag detachability has been recognized.

As will be understood from the foregoing, the flux composition according to the invention, which has such specific constituents as described herein in the aforedefined specific proportions, is remarkably improved in slag detachability and can enhance welding workability to a great extent. The flux composition enables various welding operations, including multi-layer build-up welding of thick steel materials, to be carried out simply and rapidly. The weld metal obtained by submerged arc welding using the flux of the present invention is excellent in physical properties, such as toughness and resistance to cracking, and shows good detachability of slag, so that the slag inclusion into the weld metal can be suppressed to a minimum, and thus giving a weld metal of very high quality.

Having generally described the invention, a more complete understanding can be obtained by reference to certain specific examples, which are provided herein for purposes of illustration only and are not intended to be limiting unless otherwise specified.

Experimental Example

Melting fluxes A-L (in which A-F are inventive examples, and G-L are comparative examples) of formulations indicated in Table 1 were prepared and used to conduct one layer—one pass welding using a grooved shape and welding conditions indicated in Table 2. The welding wire used was a 0.12 C—1.95 Mn—base wire of 4.0 mm diameter.

The results of the test, including the slag detachability, impact strength (−40° C.·kg m) of each obtained weld metal, presence or absence of slag inclusion, and shape of bead are shown in Table 2.

TABLE 1

| Components of Flux | Fluxes of the Invention (% by weight) | | | | | | Comparative Fluxes (% by weight) | | | | | |
|---|---|---|---|---|---|---|---|---|---|---|---|---|
| | A | B | C | D | E | F | G | H | I | J | K | L |
| MgO | 7 | 14 | 10 | 6 | 7 | 6 | 4 | 4 | 4 | 17 | 22 | 28 |
| CaO | 9 | 5 | 8 | 5 | 9 | 5 | 4 | 13 | 10 | 12 | 2 | 3 |
| $CaF_2$ | 15 | 10 | 15 | 19 | 15 | 19 | 22 | 8 | 10 | 8 | 20 | 10 |
| $Al_2O_3$ | 19 | 15 | 19 | 19 | 19 | 19 | 13 | 19 | 28 | 23 | 18 | 25 |
| $TiO_2$ | 22 | 25 | 20 | 25 | 22 | 25 | 27 | 23 | 17 | 18 | 20 | 25 |
| SiO | 18 | 20 | 18 | 15 | 18 | 15 | 22 | 13 | 18 | 20 | 10 | 6 |
| MnO | 6 | 9 | 8 | 7 | 6 | 7 | 5 | 17 | 10 | — | 5 | — |
| $B_2O_3$ | 0.4 | — | — | 0.4 | — | — | — | — | — | — | 0.4 | — |
| Others | 3.6 | 2.0 | 2.0 | 3.6 | 4.0 | 4.0 | 3.0 | 3.0 | 3.0 | 2.0 | 2.6 | 3.0 |

TABLE 2

| Plate Thickness (mm) | Number of Electrode | Shape of Groove | Pass | Current (A) | Voltage (V) | Speed (cm/min) | Interpass Temperature (°C.) |
|---|---|---|---|---|---|---|---|
| 50 | Two | (see figure) | 1 ~ 2 | L.400 | 35 | 30 | |
| | | | 3 ~ 4 | L.450 | 34 | 50 | |
| | | | | T.450 | 34 | | |
| | | | 5 ~ 7 | L.450 | 35 | 50 | 150 ~ 200 |
| | | | | T.450 | 35 | | |
| | | | 8 ~ 10 | L.550 | 35 | 50 | |
| | | | | T.550 | 35 | | |
| | | | 11 | L.600 | 36 | 50 | |
| | | | | T.600 | 36 | | |

TABLE 3

| Fluxes | | *1 Slag Detachability | *2 Impact Strength −40° C. (kg · m) | Number of Generated Slag Inclusion | *3 Shape of Bead |
|---|---|---|---|---|---|
| Fluxes of Invention | A | ++ | 10.1 | 0 | ++ |
| | B | ++ | 7.5 | 0 | ++ |
| | C | ++ | 8.1 | 0 | ++ |
| | D | + | 11.0 | 0 | ++ |

TABLE 3-continued

| Fluxes | | *1 Slag Detachability | *2 Impact Strength −40° C. (kg · m) | Number of Generated Slag Inclusion | *3 Shape of Bead |
|---|---|---|---|---|---|
| | E | ++ | 7.9 | 0 | ++ |
| | F | + | 8.4 | 0 | + |
| Comparative Fluxes | G | X | 5.0 | 0 | + |
| | H | Δ | 6.4 | 0 | Δ |
| | I | Δ | 5.8 | 8 | Δ |
| | J | + | 5.4 | 7 | X |
| | K | X | 7.0 | 8 | X |
| | L | + | 5.9 | 10 | X |

*1,3
++Very good
+Good
ΔSlightly bad
X Bad
*2
The number of generated slag inclusions in a length of one meter of a final pass weld metal.

As is clearly seen from the results of Table 3, the fluxes A through F, which satisfy the requirements of the present invention, are completely free of slag inclusion and show good detachability of slag. Especially when the fluxes A and D containing 0.4% of $B_2O_3$ are used, the impact strengths of the weld metals become excellent. The comparative flux G contains reduced amounts of MgO and $Al_2O_3$ and shows poor slag detachability. The comparative flux H is low in MgO and is thus rather poor in slag detachability. The comparative flux I contains a larger amount of $Al_2O_3$ and smaller amounts of MgO and $TiO_2$, so that slag inclusions are observed and the slag detachability is rather poor. The comparative flux J contains a larger amount of $Al_2O_3$, resulting in generation of slag inclusions. Comparative examples K and L show that high levels of MgO cause poorer impact values of the weld, increase the occurrence of slag inclusion in the weld, and worsen the shape and appearance of the bead, thereby decreasing the strength of the weld.

Additional Experimental Examples

Steel plates Nos. 1 and 2 having a thickness of 16 mm which have chemical composition as shown in Table 4, were welded with melting fluxes A and D according to the present invention and melting fluxes I, J, K and L (comparative examples) as shown in Table 1. Welding wires used were 0.13 C—1.95 Mn base wire and 0.10 C—1.65 Mn—0.5 Mo type wire, both having a diameter of 4.0 mm. The welding conditions are shown in Table 5, and the results of the test, including impact strength (−40° C.·Kg·m) of each obtained weld metal, presence of slag inclusion, and shape of bead, are shown in Table 6. The welding conducted in this test is both side welding with each pass on each side as shown in Table 5.

TABLE 4

| Steel Plate | Plate Thickness | Chemical Composition (%) | | | | | | | | | |
|---|---|---|---|---|---|---|---|---|---|---|---|
| | | C | Si | Mn | P | S | Ni | Mo | Cu | Nb | Ti |
| No. 1 | 16 mm | 0.05 | 0.18 | 1.92 | 0.017 | 0.005 | 0.29 | 0.35 | — | 0.054 | 0.010 |
| No. 2 | 16 mm | 0.06 | 0.27 | 1.22 | 0.020 | 0.003 | — | — | 0.28 | 0.024 | 0.09 |

TABLE 5

| Shape of Groove | Wire Dia. (mm) | Pass | Current (Ampere) | Voltage (Volt) | Speed | Distance Between Electrodes |
|---|---|---|---|---|---|---|
| | 4.0 | 1 | L.900 | 36 | 100 | 15 |
| | | | T.660 | 42 | | |
| | | 2 | L.900 | 36 | 100 | 15 |
| | | | T.660 | 42 | | |

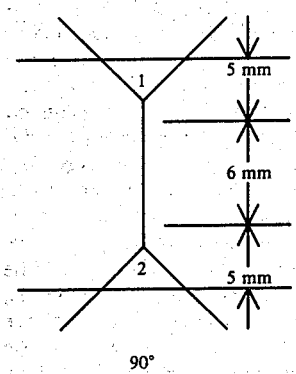

TABLE 6

| Steel | Welding Wire | Flux | Impact Value −40° C. . Kg . m | Number of Generated Slag Inclusion | Shape of Bead |
|---|---|---|---|---|---|
| No. 1 | 0.13 C—1.95 Mn | A | 17.0 | 0 | ++ |
| | | D | 18.2 | 0 | ++ |
| | | I | 6.8 | 4 | Δ |
| | | J | 5.9 | 3 | + |
| | | K | 11.4 | 5 | Δ |
| | | L | 7.0 | 6 | X |
| No. 2 | 0.10 C—1.65 Mn—0.5 Mo | A | 15.8 | 0 | ++ |
| | | D | 16.0 | 0 | ++ |
| | | I | 7.1 | 7 | Δ |
| | | J | 6.4 | 9 | + |
| | | K | 10.5 | 7 | Δ |
| | | L | 6.4 | 10 | X |
| (1 pass) | 0.13 C—1.95 Mn | A | 15.9 | 0 | ++ |
| | | D | 14.8 | 0 | ++ |
| | | I | 6.8 | 6 | Δ |
| (2 passes) | 0.10 C—1.65 Mn—0.5 Mo | J | 6.5 | 8 | + |
| | | K | 9.7 | 8 | Δ |
| | | L | 5.9 | 10 | X |

As can be seen from the above test results, superior impact strength of the weld metal and better shape of bead could be obtained when the melting flux according to the present invention is used. Also, the occurrence of generated slag inclusion is near zero in accordance with the present invention.

Having now fully described the invention, it will be apparent to one of ordinary skill in the art that many changes can be made thereto without departing from the spirit or scope of the invention as set forth herein.

What is claimed is:

1. A melting flux composition for submerged arc welding comprising 6–15% by weight of MgO, 5–10% by weight of CaO, 10–20% by weight of $CaF_2$, 14–19% by weight of $Al_2O_3$, 20–25% by weight of $TiO_2$, 15–20% by weight of $SiO_2$, and 5–10% by weight of MnO.

2. A melting flux composition according to claim 1, further comprising about 0.1–1.5% by weight of $B_2O_3$.

3. A melting flux composition according to claim 1 or 2, further comprising up to 15% by weight of iron oxide and an alkali metal oxide in total.

4. A melting flux composition according to claim 3, wherein said alkali metal oxide is $Na_2O$ or $K_2O$.

5. A melting flux according to claim 1, wherein said flux composition is in the form of granules having a size distribution such that granules having sizes greater than 840 microns are present in an amount of less than 5% by weight and granules having sizes smaller than 420 microns are present in an amount of greater than 50% by weight, both amounts based on the total granule composition.

* * * * *

UNITED STATES PATENT AND TRADEMARK OFFICE
CERTIFICATE OF CORRECTION

PATENT NO. : 4,338,142
DATED     : July 6, 1982
INVENTOR(S) : NAOKI OKUDA, ET AL.

It is certified that error appears in the above-identified patent and that said Letters Patent is hereby corrected as shown below:

Please correct the following Foreign Application Priority Data:

[30] -- Foreign Application Priority Data

June 27, 1980  [JP]  Japan.....55-88424 --

Signed and Sealed this

Fourteenth Day of September 1982

[SEAL]

Attest:

*Attesting Officer*

GERALD J. MOSSINGHOFF

*Commissioner of Patents and Trademarks*